(12) United States Patent
Mohiyaddin et al.

(10) Patent No.: US 12,462,179 B2
(45) Date of Patent: Nov. 4, 2025

(54) QUBIT DEVICE

(71) Applicant: IMEC VZW, Leuven (BE)

(72) Inventors: Fahd Ayyalil Mohiyaddin, Kessel-Lo (BE); Stefan Kubicek, Pellenberg (BE); Clement Godfrin, Brussels (BE); Bogdan Govoreanu, Hulshout (BE); Steven Brebels, Heverlee (BE); Ruoyu Li, Leuven (BE); George Eduard Simion, Scherpenheuvel-Zichem (BE)

(73) Assignee: IMEC VZW, Leuven (BE)

( * ) Notice: Subject to any disclaimer, the term of this patent is extended or adjusted under 35 U.S.C. 154(b) by 504 days.

(21) Appl. No.: 18/060,154

(22) Filed: Nov. 30, 2022

(65) Prior Publication Data
US 2023/0196166 A1   Jun. 22, 2023

(30) Foreign Application Priority Data
Dec. 9, 2021 (EP) .................................... 21213462

(51) Int. Cl.
| G06N 10/40 | (2022.01) |
| G06N 10/20 | (2022.01) |
| H10D 48/00 | (2025.01) |
| H10D 62/10 | (2025.01) |
| H10D 64/27 | (2025.01) |

(52) U.S. Cl.
CPC ............. *G06N 10/40* (2022.01); *G06N 10/20* (2022.01); *H10D 48/3835* (2025.01); *H10D 62/126* (2025.01); *H10D 64/27* (2025.01)

(58) Field of Classification Search
CPC .... H10D 48/3835; H10D 64/27; G06N 10/40; G06N 10/20
See application file for complete search history.

(56) References Cited

PUBLICATIONS

Extended European Search Report and Written Opinion, Application No. EP 21213462.1, mailed Jul. 6, 2022, 6 pages.
Simion, G., F. A. Mohiyaddin, R. Li, M. Shehata, NI Dumoulin Stuyck, A. Elsayed, F. Ciubotaru et al. "A scalable one dimensional silicon qubit array with nanomagnets." In 2020 IEEE International Electron Devices Meeting (IEDM), pp. 30-32. IEEE, 2020.

(Continued)

*Primary Examiner* — Matthew L Reames
(74) *Attorney, Agent, or Firm* — McDonnell Boehnen Hulbert & Berghoff LLP

(57) ABSTRACT

A qubit device includes first and second linear qubit arrays. Each qubit array includes a semiconductor substrate, control gates configured to define a single row of quantum dots along the substrate, and nanomagnets distributed along the row of quantum dots such that a nanomagnet is arranged at every other pair of quantum dots of the row of quantum dots. Each nanomagnet has an out-of-plane magnetization with respect to the substrate, where the rows of the first and second arrays extend in a common row direction and are separated along a direction transverse to the row direction. The qubit device further includes superconducting resonators connecting pairs of quantum dots between the first and second arrays. Each pair of quantum dots in the first array is configured to couple with a superconducting resonator of the first set to connect with a different pair of quantum dots of the second array.

20 Claims, 5 Drawing Sheets

(56) References Cited

PUBLICATIONS

Mi, Xiao, Monica Benito, Stefan Putz, David M. Zajac, Jacob M. Taylor, Guido Burkard, and Jason R. Petta. "A coherent spin-photon interface in silicon." Nature 555, No. 7698 (2018): 599-603.

Mohiyaddin, F. A., R. Li, S. Brebels, G. Simion, NI Dumoulin Stuyck, C. Godfrin, M. Shehata et al. "Large-Scale 2D Spin-Based Quantum Processor with a Bi-Linear Architecture." In 2021 IEEE International Electron Devices Meeting (IEDM), pp. 27-5. IEEE, 2021.

QUBIT DEVICE

CROSS-REFERENCE TO RELATED APPLICATIONS

The present application is a non-provisional patent application claiming priority to European Patent Application no. 21213462.1, filed on Dec. 9, 2021, the contents of which are hereby incorporated by reference.

FIELD OF THE DISCLOSURE

The present disclosure relates to a qubit device.

BACKGROUND

Silicon quantum dot-based qubit systems are candidates for large scale quantum processors. The qubits are generally encoded by the spin state of single electrons or holes trapped inside a quantum dot. Some characteristics of such a system is long quantum coherence, allowing high fidelity operations and quantum error correction, and a small physical qubit size, enabling high qubit number integration. The use of silicon is largely compatible with standard silicon manufacturing technology, facilitating integration.

Such a qubit system can have millions of qubits in order to enable different processing operations and to correct for errors. Generally, two-dimensional qubit arrays are considered due to their compatibility with more error correction methods with a manageable error threshold and higher efficiency for quantum algorithms, in comparison to linear arrays. However, there are several challenges related to the upscaling of spin qubit systems.

For example, unlike conventional transistors where the input and output can be cascaded, qubits usually require analog voltage signals applied on each of them with a high frequency range between a few hundred Hz to several GHz. Also, the physical size of the qubit is small, typically around 50 nm in diameter, thus making it hard to access the qubits in the middle of a large 2D array considering the wiring fanout and crosstalk effects.

SUMMARY

Accordingly, there is a need for a spin-based qubit device that can be upscaled to a large-scale qubit system with millions of qubits. An objective of the present disclosure is thereby to provide a scalable qubit device that at least partly addresses some or all of the challenges relating to upscaling.

According to an aspect of the present disclosure there is provided a qubit device comprising a first and a second linear qubit array. Each qubit array comprises: a semiconductor substrate layer; a set of control gates configured to define a single row of electrostatically confined quantum dots along the substrate layer, each quantum dot being suitable for holding a qubit; and a set of nanomagnets distributed along the row of quantum dots such that a nanomagnet is arranged at every other pair of quantum dots of the row of quantum dots.

Each nanomagnet has an out-of-plane magnetization with respect to the substrate layer and every other pair of quantum dots are subjected to an out-of-plane magnetic field generated by a respective nanomagnet, such that a qubit spin resonance frequency of every other pair of quantum dots is shifted with respect to an adjacent pair of quantum dots of the row of quantum dots.

The rows of the first and second array extend in a common row direction and are separated along a direction transverse to the row direction.

The qubit device further comprises: a set of superconducting resonators connecting pairs of quantum dots between the first and second array, wherein each pair of quantum dots in the first array is configured to couple with a superconducting resonator of the set to connect with a different pair of quantum dots of the second array.

A qubit device according to this aspect can address some of the previously identified challenges of scalability of spin-based qubit devices.

Such a qubit device can be greatly scalable as the length of each qubit array is only limited by wafer size and manufacturing details. Accordingly, upscaling to millions of qubits is relatively straightforward, especially as the qubits are so small and densely packed that it would not require much space e.g. on a substrate. For example, one million qubits may be divided over two qubit arrays of 10 cm in length, assuming a maximum dot pitch of 100 nm and a pair of quantum dots holding a single qubit.

Also, because the two arrays are spaced apart and because of their relatively simple construction, individual gate electrodes of the set of control gates may be connected and wired to the side of each qubit, thereby simplifying the access to each qubit and reducing wiring fanout complications. This is also compatible with different multiplexing protocols.

As used herein, the term "out-of-plane" (e.g. in relation to a magnetization or a magnetic field) refers to an orientation or direction at least having a major component transverse to the substrate layer (e.g. to a main plane of extension of the substrate layer).

As used herein, the term "nanomagnet" refers to a permanent magnet with a submicron dimension, e.g. at least a submicron length dimension (i.e. along the row direction), optionally also a submicron width dimension (i.e. along a direction transverse to the row direction, in plane with respect to the substrate layer). Also, a height or thickness dimension of the nanomagnets (i.e. along an out-of-plane direction with respect to the substrate layer) may be of a submicron dimension. A length dimension and a width dimension of the nanomagnets may according to embodiments be 200 nm or less, e.g. 150 nm or less. A length dimension of the nanomagnets may in any case be such that each nanomagnet extends above (i.e. "covers") only a single pair of respective quantum dots. A height dimension of the nanomagnets may be greater than the length and/or width dimensions, such as 200 nm, 400 nm, or greater. It is potentially beneficial for the height dimension of the nanomagnets to be greater than the length and/or width dimensions, for proper magnetization in the height direction.

The semiconductor substrate layer may be the same or different substrate layers for each qubit array. However, from a fabrication perspective it may be simpler to use a single substrate.

The small dimensions offered by nanomagnets, together with their arrangement, contributes to the area efficiency of the device design.

Furthermore, the provision of nanomagnets with an out-of-plane magnetization with respect to the substrate layer allows inducing a magnetic field (with an out-of-plane orientation) in the respective pair of quantum dots at each nanomagnet.

An out-of-plane orientation of the magnetic field further mitigates undesired spin-orbit coupling and variation of the Landé g-factor produced by substrate-interface non-uniformities. An in-plane magnetic field at the quantum dots may cause a residual spin-orbit coupling that may introduce a degree of unpredictability for the qubit resonant frequencies.

The set of nanomagnets is distributed along the row of quantum dots such that a nanomagnet is arranged, for example, only at every other pair of quantum dots of the row of quantum dots and not at the other intermediary pairs of quantum dots.

Defining (e.g., only) every other pair of quantum dots of the row of quantum dots to be subjected to an out-of-plane magnetic field results in shifting of the qubit spin resonance frequency at every other pair of quantum dots with respect to an adjacent pair of quantum dots. This in turn allows qubits in pairs of quantum dots located at nanomagnets to be addressed selectively to qubits in pairs of quantum dots not located at nanomagnets.

The qubit device may in addition to the nanomagnets comprise a magnetic arrangement configured to contribute with a uniform out-of-plane magnetic field to each pair of quantum dots. It is to be understood that this magnetic field contribution is in addition to the out-of-plane magnetic fields generated by the nanomagnets.

The resonators are superconducting such that they have high quality factors to help ensure that the qubit stability times are long enough, for example during readout and coupling.

In an idle, initialized state, the qubit device comprises a number of qubit states defined by a single charge carrier (electron or hole) in each pair of quantum dots. Each charge carrier has a spin state that defines its qubit state, similar to a bit being considered a 1 or 0 in traditional computer science.

The nanomagnets increase the spin-orbit coupling between the charge carriers defining the qubit states, which enables a more reliable electrical control over the qubits, e.g. via the superconducting resonators or by varying the position of the qubit electrically with voltages applied to the gate electrodes.

According to one embodiment, the rows of quantum dots of the first and second qubit arrays are arranged in a single qubit plane different from a resonator plane comprising the superconducting resonators.

The qubit plane and the resonator plane may be parallel with the substrate layer.

These planes can enable simple construction and reduce interference.

According to one embodiment, the first linear qubit array comprises a first portion comprising a first subset of the pairs of quantum dots and a second portion comprising a second subset of the pairs of quantum dots and the set of superconducting resonators is a first set that connects a pair of quantum dots in first portion of the first array with a pair of quantum dots in the second array; and wherein the qubit device further comprises a second set of superconducting resonators connecting a pair of quantum dots in the second portion of the first array with a pair of quantum dots in the second array.

This exemplifies a further scaling option for the qubit device, whereby a two-dimensional bi-linear array is formed. Accordingly, the different portions form different effective rows of an effective two-dimensional matrix formed by the two linear qubit arrays.

The first linear qubit array may comprise any number of portions in a corresponding manner.

According to one embodiment, the second linear qubit array comprises a first portion comprising a first subset of the pairs of quantum dots and a second portion comprising a second subset of the pairs of quantum dots and the set of superconducting resonators is a first set that connects a pair of quantum dots in the first portion of the first array with a pair of quantum dots in the first portion of the second array; a second set of superconducting resonators connects a pair of quantum dots in the second portion of the first array with a pair of quantum dots in the first portion of the second array; and wherein the qubit device further comprises a third set of superconducting resonators connecting a pair of quantum dots in the second portion of the first array with a pair of quantum dots in the second portion of the second array.

This exemplifies even further scaling for the qubit device. The second linear qubit array may comprise any number of portions in a corresponding manner.

According to one embodiment each portion of the first and second linear qubit array comprises the same number of quantum dots.

This ensures a regular X×Y effective matrix where X is the same number of quantum dots of each portion and Y is the total number of portions.

Each portion may be separate and independent or parts of a same qubit array. The portions within each single qubit array might not be directly connected to each other, wherein the disconnection may be achieved by using dielectrics and/or an applied potential. Alternatively, operations may be configured to not enable qubits to interact directly between portions across a single qubit array when the qubit device is in use.

According to one embodiment, the first and third sets of superconducting resonators are arranged in a first resonator plane and the second set of superconducting resonators is arranged in a second resonator plane different from the first resonator plane.

Alternatively, the second set of superconducting resonators is arranged in the first resonator plane and the first and third sets of superconducting resonators are arranged in the second resonator plane.

These planes enable simple construction and reduce interference and crosstalk.

According to one embodiment, the first resonator plane is arranged between a first and second grounding plane and the second resonator plane is arranged between the second and a third grounding plane, wherein the first grounding plane is arranged between a qubit plane comprising the rows of quantum dots of the first and second qubit arrays and the first resonator plane.

Accordingly, the grounding planes sandwich the resonator planes. The grounding planes may be important for the resonators to function and this arrangement has a further benefit of reducing crosstalk between resonators in different planes.

The qubit plane, resonator planes, and the grounding planes may be parallel with the substrate layer.

According to one embodiment, the superconducting resonators are arranged parallel to each other. In embodiments with superconducting resonators that are arranged in two different resonator planes, each resonator in a plane of resonators may be parallel to each other but not compared to the resonators in the other plane.

In one embodiment, the resonators are arranged at an angle of around 45° (e.g., 35°-55°) to the row direction and resonators that are arranged in two different resonator planes are arranged at an angle of around 90° (e.g., 80°-100°) to each other.

According to one embodiment, the superconducting resonators are stripline resonators.

Stripline resonators are smaller than alternatives, such as coplanar waveguides, thereby being well-suited for this geometry as crosstalk is reduced.

According to one embodiment, each qubit array further comprises a set of plunger gates arranged along a longitudinal direction of the row of quantum dots and configured to tune an electric potential of each pair of quantum dots.

By tuning the electric potential for each individual pair of quantum dots, irregularities in the different pairs of quantum dots may be compensated for.

According to one embodiment, the qubit device further comprises a set of connector vias, wherein each connector via connects a pair of quantum dots to at least one superconducting resonator.

These connector vias may be vertical structures connecting different planes of qubits and resonators.

According to one embodiment, the set of nanomagnets of each qubit array is distributed in two rows along the row of quantum dots such that every other pair of quantum dots of the row of quantum dots is arranged between a pair of nanomagnets as viewed along a direction transverse to the row direction.

Such an arrangement provides symmetry that improves the stability of the qubits by minimizing unwanted magnetic field gradients, and thereby reducing the impact of electrical noise on the qubit.

According to one embodiment, the set of control gates of each qubit array comprises a pair of longitudinal confinement gates arranged at mutually opposite sides of the row of quantum dots as viewed along a direction transverse to the row direction.

As used herein, the term "longitudinal confinement gate" refers to a gate configured to confine the quantum dots in a transverse direction (e.g., in-plane with respect to the substrate layer) with respect to the row direction.

Such confinement gates further increase the stability of the quantum dots. The pair of confinement gates may be common to all quantum dots of a single array, thereby limiting the number of control gates required.

According to one embodiment, the set of control gates of each qubit array comprises barrier gates and plunger gates arranged alternatingly along the row direction.

As used herein, the term "barrier gate" refers to a gate configured to confine the quantum dots in the row direction. Each barrier gate may also define a tunnel barrier between each neighboring quantum dot.

As used herein, the term "plunger gate" refers to a gate configured to mainly control a (electrochemical) potential of a respective quantum dot. Each plunger gate is hence associated with a respective quantum dot. Each plunger gate may control the charge accumulated at the associated quantum dot.

It is noted that the barrier gates may also control a (electrochemical) potential of an adjacent quantum dot through capacitive coupling, similar to the control of the plunger gate. However, a stronger coupling and thereby a greater control may be achieved by using plunger gates.

The barrier gates determine the confinement of the quantum dots, while also enabling control over the potential barriers separating the different potential wells, and the plunger gates enable tuning the electrochemical potential for each individual potential well of the quantum dots. By arranging them alternatingly, each pair of quantum dots may have two potential wells, each being associated with a plunger gate, a barrier gate between the two potential wells, and two barrier gates surrounding the pair of potential wells, each being shared with an adjacent pair of quantum dots.

According to one embodiment, the qubit device further comprises a reservoir gate arranged at each qubit array.

Such a reservoir gate may be used to create a reservoir of charge carriers, e.g. at a substrate-dielectric interface. Then, by controlling e.g. plunger gates of the qubit device, charge carriers may be shuttled into each pair of quantum dots to initialize the qubit device.

The reservoir gate may extend along the entire length of each qubit array in the row direction. Alternatively, the reservoir gate may comprise any number of gate portions arranged along the entire length of each qubit array in the row direction. This simplifies and speeds up initialization as there is thereby no need to shuttle charge carriers from a pair of quantum dots with an available charge carrier to any pair of quantum dots without an available charge carrier.

According to one embodiment, the qubit device is configured to apply a single-qubit gate operation to a qubit state within the row of electrostatically confined quantum dots of each qubit array by varying a potential of a first pair of quantum dots comprising a qubit, and to supply a radio-frequency electric or magnetic control field to the qubit to control a spin state of the qubit.

An additional external static magnetic field may be applied to the qubit device, which in addition to the magnetic field generated by the nanomagnets, introduces an energy splitting between the two spin states based on the Zeeman effect.

The radio-frequency electric or magnetic control field used for qubit control may be an external field.

Such a magnetic radio-frequency control field may be used to control the charge carrier defining the qubit to achieve electron spin resonance (ESR) to switch a spin state of the qubit, with the radio-frequency being equivalent to the energy splitting between the spin states. Alternatively, an electric radio-frequency control field along with a magnetic field gradient may be used to control the charge carrier defining the qubit to achieve electric dipole spin resonance (EDSR) to switch a spin state of the qubit, with the radio-frequency being equivalent to the energy splitting between the spin states. The magnetic field gradient may be generated by the nanomagnets or an external magnetic field.

By varying the potential, the charge carrier defining the qubit may be oriented in an optimal position or be made to experience an oscillating electric or magnetic field with a frequency that is equivalent to the energy splitting of the two spin states, thereby inducing a change of the spin state of the qubit.

Such a manner of inducing an oscillation may be more easily controlled at the fidelity of a single pair of quantum dots, thereby making such an operation simpler and more reliable.

According to one embodiment, the qubit device is further configured to apply a two-qubit gate operation to two qubit states in the first and second linear qubit array by varying a potential of a first pair of quantum dots in the first qubit array comprising a qubit state and varying a potential of a second pair of quantum dots in the second qubit array comprising another qubit state, the first and second pair of quantum dots being associated with a same superconducting resonator, and to apply a voltage to the same superconducting resonator.

By varying the potential, the charge carriers defining the qubits may be aligned to the middle of the pairs of quantum dots, which can enhance the qubits' interaction with the resonator.

By applying a voltage to the shared superconducting resonator, the two qubits aligned to the middle of their respective pair of quantum dots may interact via the resonator.

Such a two-qubit gate operation may e.g. be an iSWAP or $\sqrt{\text{iSWAP}}$ gate operation.

According to one embodiment, the qubit device is configured to read a qubit state of a pair of quantum dots by varying a potential of the pair of quantum dots, and to detect a resonance frequency of a superconducting resonator associated with the pair of quantum dots.

By varying the potential, the charge carrier defining the qubit may be aligned to the middle of the pair of quantum dots, which can enhance the qubit's interaction with the resonator.

By such a charge carrier being aligned to the middle of the pair of quantum dots, the spin state may get more strongly coupled to the resonator. Hence, the two spin states are more differentiated by their greater effect on the resonance frequency of the resonator.

According to one embodiment, the qubit device is configured to apply a two-qubit gate operation to two qubit states in the first or second linear qubit array by varying a potential of a first pair of quantum dots comprising a first qubit state and/or a second pair of quantum dots comprising a second qubit state adjacent in the row to the first pair to increase an exchange interaction between the first and second qubit states.

The potential(s) may be varied to e.g. reduce a potential barrier between the two pairs of quantum dots or to raise the bottom of a potential wells of one of the two pairs of quantum dots to shuttle the charge carrier defining the qubit state closer to the other one of the two pairs of quantum dots.

Such a two-qubit gate operation may e.g. be a SWAP or $\sqrt{\text{SWAP}}$ gate operation.

BRIEF DESCRIPTION OF THE FIGURES

The above, as well as additional, features will be better understood through the following illustrative and non-limiting detailed description of example embodiments, with reference to the appended drawings.

All the figures are schematic, not necessarily to scale, and generally only show parts which are necessary to elucidate example embodiments, wherein other parts may be omitted or merely suggested.

DETAILED DESCRIPTION

Example embodiments will now be described more fully hereinafter with reference to the accompanying drawings. That which is encompassed by the claims may, however, be embodied in many different forms and should not be construed as limited to the embodiments set forth herein; rather, these embodiments are provided by way of example. Furthermore, like numbers refer to the same or similar elements or components throughout.

Figure 1:
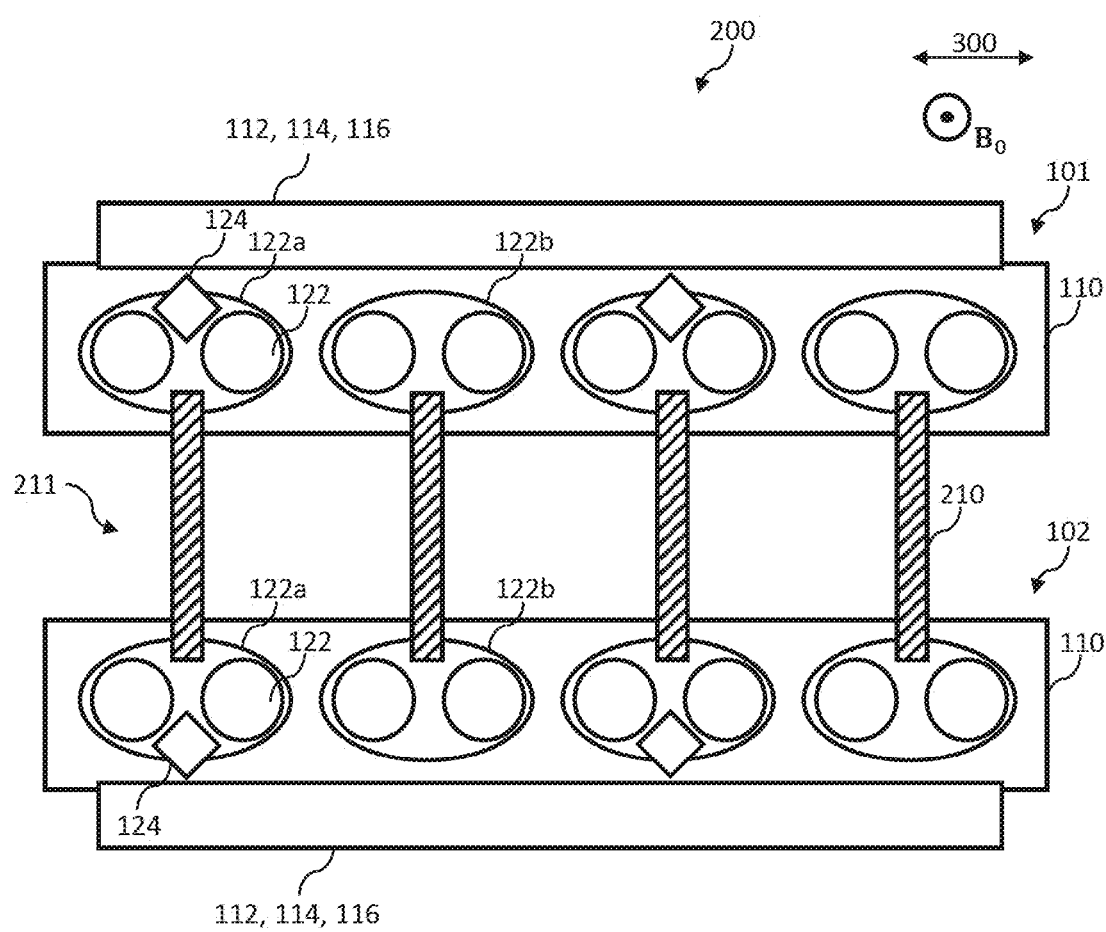
FIG. 1 is a schematic illustration of a qubit device, according to an example.

FIG. 1 illustrates a schematic top-down view of a qubit device 200. The qubit device 200 may for example be used in a quantum computing device. Examples of algorithms which may be implemented include quantum error correction, quantum chemistry algorithms, and Grover's search algorithm.

The qubit device 200 comprises a first linear qubit array 101 and a second linear qubit array 102.

The qubit arrays 101, 102 each comprise a semiconductor substrate 110 (e.g., a shared substrate layer). The semiconductor substrate 110 may e.g. be made of isotropically purified silicon. Other example materials for the semiconductor substrate 110 include germanium, GaAs, and SiGe. Silicon supports definition of high-fidelity electrostatically confined quantum dot qubits. Moreover, in view of its nearly ubiquitous use in integrated circuit technology, silicon represents a platform for a qubit device.

Each qubit array 101, 102 comprises a set of control gates 112, 114, 116 configured to define a single row of electrostatically confined quantum dots 122 along the semiconductor substrate 110, each quantum dot 122 being suitable for holding a qubit. The set of control gates 112, 114, 116 will be discussed further in relation to FIG. 2.

Each quantum dot 122 may hold one or more charge carriers (electrons or holes) defining a qubit. For simplicity, the following disclosure will however refer to single-electron qubits arranged in double-wells of two adjacent quantum dots 122 forming a pair of quantum dots 122. It is further contemplated that the principles of the qubit device 200 are compatible with hole-based qubits. Control may be easier for holes because of their intrinsic spin-orbit coupling. However, there may be a big variability in the g-factor and hence the qubit energy splitting ($g\mu_B B_0$) for the holes, also due to the intrinsic spin orbit coupling.

The rows of the first and second array 101, 102 extend in a common row direction 300 and are separated along a direction transverse to the row direction 300.

The semiconductor substrate 110 may further comprise a dielectric (shown in FIGS. 5a-d) such as silicon dioxide as an interstitial layer arranged on the semiconductor substrate 110 and embedding or separating the set of control gates 112, 114, 116 of the qubit arrays 100. For a silicon substrate 110, a 5 to 20 nm thick silicon oxide may be present between the substrate 110 and the control gates 112, 114, 116.

The quantum dots 122 may be defined at an interface between the semiconductor substrate 110 and the dielectric layer structure. This enables a monolithic qubit device 200, which may be fabricated in a rational manner relying on processing techniques from conventional CMOS device fabrication, e.g. dielectric layer deposition, gate layer deposition and patterning etc.

Each qubit array 101, 102 further comprises a set of nanomagnets 124 distributed along the row of quantum dots 122 such that a nanomagnet 124 is arranged at every other pair of quantum dots 122a of the row of quantum dots 122.

Each nanomagnet 124 has an out-of-plane magnetization with respect to the semiconductor substrate 110 and every other pair of quantum dots 122a are subjected to an out-of-plane magnetic field generated by a respective nanomagnet 124, such that a qubit spin resonance frequency of every other pair of quantum dots 122a is shifted with respect to an adjacent pair of quantum dots 122b of the row of quantum dots.

The magnetic field generated by a respective nanomagnet 124 causes a shifting of the qubit spin resonance frequency of the pair of quantum dots 122a at the respective nanomagnet 124 with respect to an adjacent (neighboring) pair of quantum dots 122b, at which there is no nanomagnet 124. The spin resonance frequency for a qubit in a magnetic field with strength B may be expressed as $E_{ZS}/h = g_e \mu_B B/h$, where $E_{ZS}$ is the Zeeman splitting between the spin states, h is the Planck constant, $g_e$ is the electron g-factor, and $\mu_B$ is the Bohr magneton. The magnetic field strength experienced by a qubit at a first pair of quantum dots 122a will be different from that experienced by a qubit at an adjacent second pair of quantum dots 122b, and therefore also their resonance frequencies will be different.

A separation between the qubit spin resonance frequencies of two adjacent pairs of quantum dots 122a, 122b may be greater than the (respective) line widths of the qubit spin resonance frequencies, for example by two orders of magnitude or more. A difference in out-of-plane magnetic field strength at two adjacent pairs of quantum dots 122a, 122b may be 5 mT or greater.

As indicated in FIG. 1, a uniform magnetic field contribution $B_0$ with an out-of-plane orientation (e.g. parallel to a z or −z direction in other figures), may also be provided at the quantum dots 122. The magnetic field $B_0$, which for illustrative purposes may be referred to as an external magnetic field $B_0$, may be generated by a magnetic arrangement of one or more permanent magnets and/or electromagnets. As may be appreciated, the magnetic field $B_0$ may also be generated by one or more magnets external to the qubit device 200.

The effective magnetic field experienced by a qubit in a pair of quantum dots 122 may hence be given by the sum of the external magnetic field $B_0$ and the local magnetic field produced by the nanomagnets 124 at the position of the pair of quantum dots 122. $B_0$ may e.g. be 0.1-0.3 T, such as 0.2 T. Such an external field together with the local magnetic field produced by the nanomagnets 124 yields a Zeeman energy splitting $E_{ZS}$ as discussed above of around 23 μeV.

As may be appreciated, the nanomagnets 124 may thus cause a local variation of the out-of-plane magnetic field along the row of pairs of quantum dots 122 such that the qubit spin resonance frequencies of every other pair of quantum dots 122a is shifted with respect to every adjacent pair of quantum dots 122b of the row.

The quantum dots 122 are shown arranged in pairs in FIGS. 1-5, however this is done mainly for the sake of facilitating understanding. In terms of manufacturing and when the qubit device 200 is not in use, the only difference between "paired" quantum dots 122 and "unpaired" quantum dots 122 is implied by the arrangement of the nanomagnets 124. When the qubit device 200 is in use, "paired" quantum dots 122 will be further distinguished by sharing a single charge carrier to define a qubit state of the pair of quantum dots 122.

Turning again to FIG. 1, every other first pair of quantum dots 122a may ideally have a same first qubit spin resonance frequency and every adjacent second pair of quantum dots 122b may have a same second spin resonance frequency. This enables control of a qubit in any one of the first quantum dots 122a using the same control signal. This applies correspondingly to a qubit in any one of the second quantum dots 122b. A same resonance frequency may be achieved e.g. using a set of identical nanomagnets 124, aligned with the pairs of quantum dots 122 such that each first pair of quantum dots 122a and each second pair of quantum dots 122b experience respective (at least substantially) equal magnetic field strengths along an out-of-plane direction compared to the semiconductor substrate 110.

It is however envisaged that e.g. different subsets of the first quantum dots 122a may have different respective qubit spin resonance frequencies (and correspondingly for the second quantum dots 122b), e.g. by using nanomagnets 124 with different strengths and/or arranged at different levels above or below the quantum dots 122.

Also, due to fabrication tolerances of the nanomagnets 124 and minor changes in the g-factor, different every other first and second pairs of quantum dots may have qubits with different resonance frequencies. Accordingly, they may require different control signals or control gates fine-tuning e.g. a potential of a specific pair of quantum dots.

The qubit device 200 further comprises a set 211 of superconducting resonators 210 connecting pairs of quantum dots 122a, 122b between the first and second array 101, 102, wherein each pair of quantum dots 122a, 122b in the first array 101 is configured to couple with a superconducting resonator 210 of the set 211 to connect with a different pair of quantum dots 122a, 122b of the second array 102.

The superconducting resonators 210 of FIG. 1 are stripline resonators. The superconducting resonators 210 are arranged parallel to each other and extend between the first and second array 101, 102.

In order to facilitate long qubit stability times during qubit gate operations and also high readout contrast between the spin states, a quality factor of the resonators 210 of at least a few thousand can be beneficial.

The resonators 210 may be designed to have a resonance frequency that is different from that of the qubits by about 200 MHz. This is done to prevent dephasing of the qubits via losses in the resonators 210.

The qubit device 200 may be fabricated using conventional CMOS processes, e.g. patterning of metal-oxide semiconductor stacks of suitable gate dielectric, gate electrode materials, and substrate material (e.g. Si, Si-28, SiGe). The nanomagnets 124 may be fabricated of a suitable magnetic material at the appropriate locations and be embedded in dielectric material.

The qubit device 200 may further comprise a non-magnetic metal layer, e.g. in the shape of a line (not shown), connected to the nanomagnets 124. The metal layer may be arranged on top of the nanomagnets 124, e.g. in direct contact with the upper surfaces of the nanomagnets 124. The metal layer 126 may reduce potential variations between the nanomagnets 124. The metal layer may be connected to an electrical ground of the qubit array 100. Suitable non-magnetic materials for the metal layer include TiN, Al, and Au.

Figure 2:
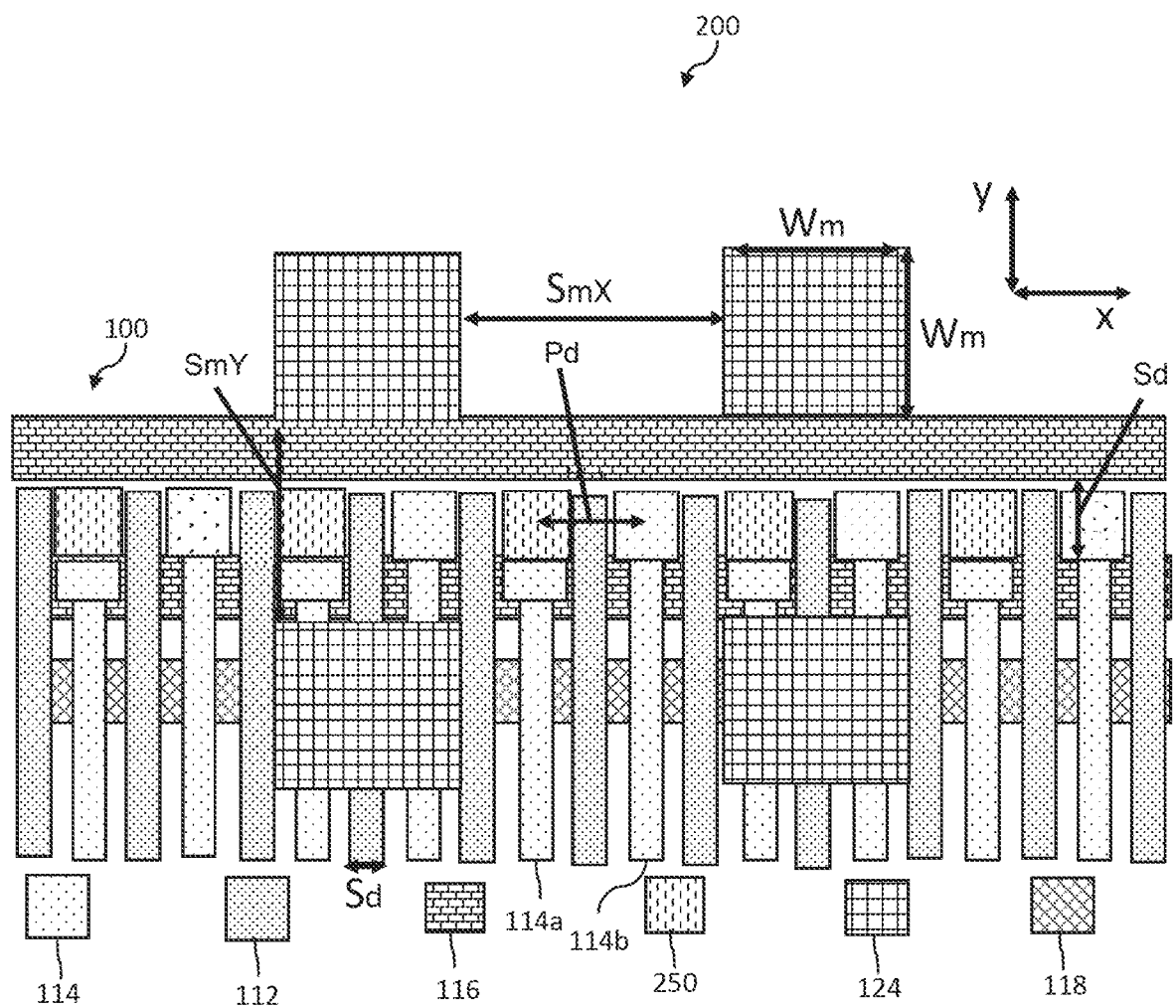
FIG. 2 is a schematic illustration of a qubit device, according to an example.

FIG. 2 illustrates a schematic top-down view of a single qubit array 101, 102 of the qubit device 200. In the example of FIG. 2, different control gates 112, 114, 116 are shown together with a specific arrangement of nanomagnets 124. Also, dimensions of the different components of the qubit device 200 are marked as $S_{mX}$, $W_m$, $P_d$, $S_{mY}$ and $S_d$.

The set of control gates of the illustrated qubit device 200 comprises barrier gates 112 and plunger gates 114 arranged alternatingly along the row direction (i.e. along the x direction).

The set of control gates further comprises a pair of (longitudinal) confinement gates 116. The confinement gates 116 are arranged at mutually opposite sides of the row of quantum dots 122 and extend alongside the same. The quantum dots 122 may be electrostatically confined by the barrier gates 112 along the x direction and by the confinement gates 116 along the y direction (i.e. a direction orthogonal to the row direction and parallel to a plane of the substrate layer).

The barrier gates 112 and the confinement gates 116 may be biased to cause a depletion of free charge carriers e.g. underneath the gates 112, 116. The electrochemical potential of each quantum dot 122, and thus the number and potential energy of accumulated charge carriers, may be controlled by a respective plunger gate 114.

The barrier gates 112 may as shown each have a same gate length and be arranged with a regular spacing. The plunger gates 114 may similarly each have a same gate length and be arranged at a central position between a respective pair of barrier gates 112. The quantum dots 122 may thus be defined with a regular spacing corresponding to the spacing of the barrier gates, indicated by $P_d$ in FIG. 2. The spacing of the nanomagnets 124 may correspond to roughly twice the quantum dot spacing and is indicated by $S_{mX}$ in the x-direction and $S_{mY}$ in the y-direction. For further increased regularly of the gate pattern, the gate length of the barrier gates 112 and the plunger gates 114 may be the same, however this is not a requirement.

By way of example, the quantum dot pitch $P_d$ may e.g. be on the order of 50 to 150 nm or for example 80 to 120 nm. A spacing of the barrier gates may be in the range of 50 to 150 nm or for example 80 to 120 nm. A center-to-center distance between a barrier gate and an adjacent plunger gate may be half of the barrier gate spacing. A gate length $S_d$ of the barrier gates and/or plunger gates may be 20 to 70 nm or for example 40 to 60 nm.

Each barrier gate 112 may be configured to apply a same barrier gate potential or voltage to every barrier gate 112. A height of the tunnel barrier between adjacent quantum dots 122 may thus be the same along the row of qubits. A tunnel barrier height may for example be in the range of 5-15 meV. This may yield a tunnel coupling $t_c$ of about 1 GHz, assuming a quantum dot pitch $P_d$ in the aforementioned range. Greater values of the tunnel coupling may be obtained with lower tunnel barrier heights. For example, a tunnel coupling $t_c$ in a range of 10-100 GHz may be achieved with a tunnel barrier height in the range of 40-400 μeV.

The voltages of the plunger gates 114 may be selected such that one or zero electrons are confined in the associated pair of quantum dots 122. Further, the plunger gates 114 may be configured to tune the electric potential of each pair of quantum dots 122. For example, the plunger gates 114 may be configured to tune the electric potential such that a charge carrier is aligned to the middle of the two quantum dots 122 defining the pair of quantum dots 122. This may be useful for qubit gate operations, which will be discussed in more detail with regards to FIGS. 5a-d.

With holes as charge carriers, negative voltages would be applied to define barriers of the quantum dots 122 in a similar manner.

Charge carriers defining the qubits may be loaded into or unloaded from the row of qubits 112 from respective charge carrier reservoirs defined by respective reservoir gates 118. Such a reservoir gate 118 may be arranged at each qubit array 101, 102 by at least one end of the row of quantum dots 122. Charge carrier reservoirs may e.g. be 2DEG electrons.

The set of nanomagnets 124 may, by way of example, be square shaped on the order of 100 to 300 nm wide $W_m$ and 300-500 nm tall (not shown).

The set of nanomagnets 124 shown in FIG. 2 is distributed in two rows along the row of quantum dots 122 such that a pair of nanomagnets 124 are arranged at every other pair of quantum dots of the row of quantum dots 122, each pair of nanomagnets 124 being arranged at mutually opposite sides of the row of quantum dots 122 in a y-direction transverse to the row direction.

Reference sign 114 has been used to commonly refer to the plunger gates 114, while in the following, reference signs 114a and 114b will refer to a first and second plunger gates associated with different quantum dots of a single pair of quantum dots 122, respectively, whereby the quantum dot 122 associated with the first plunger gate 114a is connected to at least one resonator, e.g. through a connector via 250, and the quantum dot 122 associated with the second plunger gate 114b is not.

By virtue of the resonator(s) and/or their connector via(s) 250 taking up space at every other quantum dot 122, the first plunger gate 114a associated with such a quantum dot 122 may be shaped differently. The first plunger gate 114a may still function in the same manner as the second plunger gate 114b.

The set of nanomagnets 124 may be arranged in a common plane, over or under the set of control gates in relation to the substrate layer.

That is, each nanomagnet 124 of the set of nanomagnets may be arranged at a (same) level or layer with respect to the substrate layer, different from a level of the set of control gates. Arranging the nanomagnets at a level over the gates may facilitate manufacturing. Further, the thickness (i.e. vertical dimension) of the nanomagnets 124 may thereby be chosen freely without influencing the level of the gates above the semiconductor substrate layer. This arrangement may also prevent the nanomagnets 124 from disturbing the gates.

If the set of control gates comprises barrier gates and plunger gates as discussed above, the barrier gates 112 and plunger gates 114 may be arranged at a (same) first level over the substrate layer, and the set of nanomagnets 124 may be arranged at a (same) second level over or under the first level.

If the set of control gates further comprises a pair of confinement gates 116 as discussed above, the confinement gates 116 may be arranged at a third level over the substrate, the third level being located below the second level and/or the first level or being the same level as e.g. the first level. The nanomagnets 124, the barrier and plunger gates 112, 114, and the confinement gates 116 may hence be disposed at different respective levels above the substrate layer, thereby enabling a stacked and accordingly area-efficient design. However, an alternative configuration is also possible.

Many relevant quantum algorithms require a lot of "good" qubits (without errors) in a qubit device. In order to correct for error in qubits, there are a number of error correction schemes that are realized in a 2D array arrangement of qubits. In such a 2D arrangement of qubits, the qubits surrounding a first qubit may be used to probe and correct for errors in the first qubit. Several of such clusters of surrounding qubits may be defined as a logical qubit, which comprises a number of physical qubits. To reduce the errors required to an error threshold of around 0.5%, such logical qubits may comprise well over a thousand physical qubits, such as tens or hundreds of thousands. However, as the errors reduce, a smaller number of qubits may be required to encode a logical qubit.

Accordingly, if a quantum algorithm requires at least a thousand logical qubits and each such logical qubit comprises a thousand physical qubits, a qubit device preferably comprises at least a million physical qubits.

However, it has historically been difficult to design a qubit device with millions of physical qubits that is both space efficient and controllable. As the 2D array structure has been seen as a requirement for error correction, there are a number of 2D array concepts for a qubit device. However, in order to ensure the electron spin interaction between adjacent qubits that is used in error correction, physical qubits may be separated by at most 100 nm, for example less than 100 nm for a larger interaction. In a 2D array, this leaves very little room for control gates to actually control the qubits in a quantum algorithm, along with a complicated wiring fanout. Conventional methods that address this control issue are generally not space efficient, are very difficult to manufacture, and/or may require a very high uniformity of the qubits.

Figure 3:
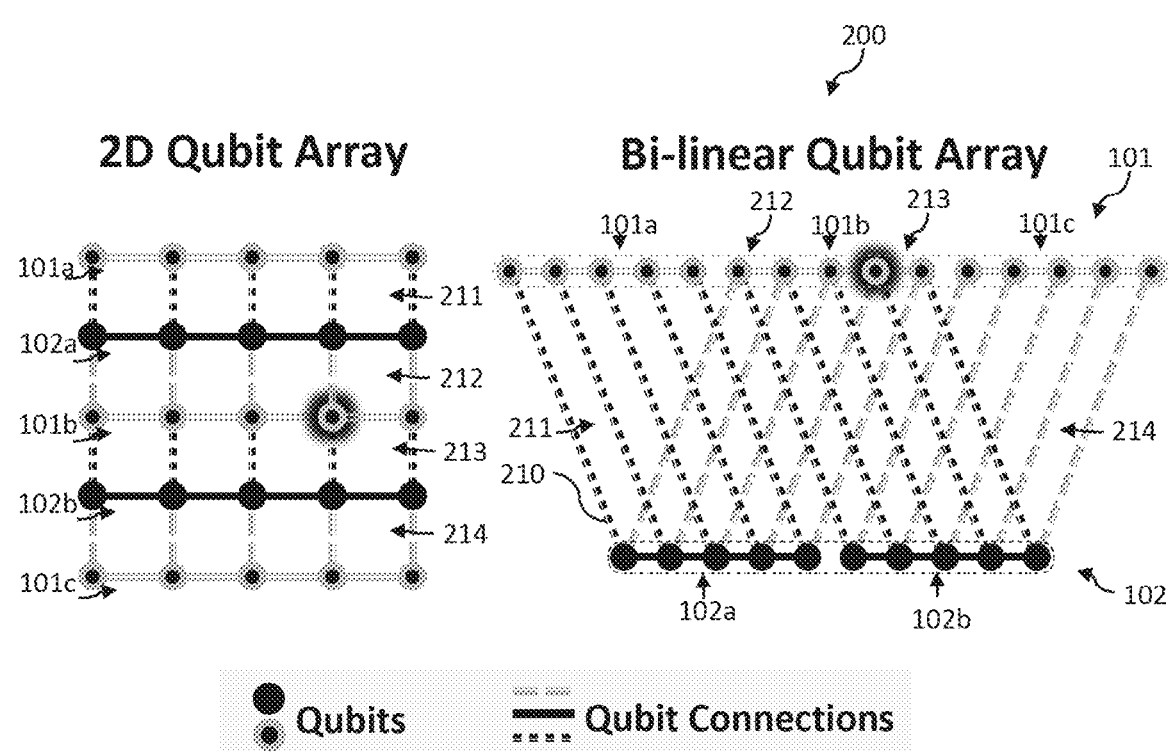
FIG. 3 is a schematic illustration of a qubit device, according to an example.

FIG. 3 is a schematic illustration of an example use case for the qubit device 200 that emulates the 2D array required for error correction, while still physically remaining 1D with all the benefits of space efficiency and control that has been mentioned previously with regards to FIGS. 1-2.

For reference, a qubit device 200 according to this example having one million physical qubits (i.e. two million quantum dots) with a "maximum" separation of 100 nm between quantum dots may still have a physical area (quantum logic area) of 36 mm$^2$.

The left side of FIG. 3 shows a standard 2D array (a matrix), where a qubit (represented by a circle) has up to four neighboring qubits, which may be used for error correction.

The right side of FIG. 3 shows a mapping of the same 2D array on the qubit device 200. This mapping is called a bi-linear array. By each resonator connecting pairs of quantum dots between the first and second array, each qubit may sense up to four neighboring qubits.

As an example, the marked qubit in the left figure corresponds to the marked qubit in the right figure, which senses the two adjacent quantum dot pairs in the same qubit array via short range exchange interaction and also senses two pairs of quantum dots in the other qubit array via long range resonator-based photonic interaction.

In order to map several rows of the left-hand matrix to the qubit device 200, the first linear qubit array 101 comprises first, second, and third portions 101a, 101b, 101c and the second linear qubit array 102 comprises first and second portions 102a, 102b. Each portion 101a, 101b, 101c, 102a, 102b corresponds to a row in the left-hand matrix.

Each portion 101a, 101b, 101c, 102a, 102b of the first and second linear qubit array 101, 102 comprises the same number of quantum dots, which maps to the number of columns in the left-hand matrix.

Different portions 101a, 101b, 101c, 102a, 102b of the same linear qubit array 101, 102 are shown as being separate in FIG. 3. In order to map the bi-linear qubit array to the 2D qubit array, no exchange interaction exists between different portions 101a, 101b, 101c, 102a, 102b of the same linear qubit array 101, 102. This may be facilitated in a number of ways, either through the use of e.g. barrier gates generating a permanent potential barrier between different portions 101a, 101b, 101c, 102a, 102b or through algorithms and qubit gate operations not being configured to (or allowed to) induce an exchange interaction between adjacent qubits of different portions 101a, 101b, 101c, 102a, 102b.

Figure 4A:
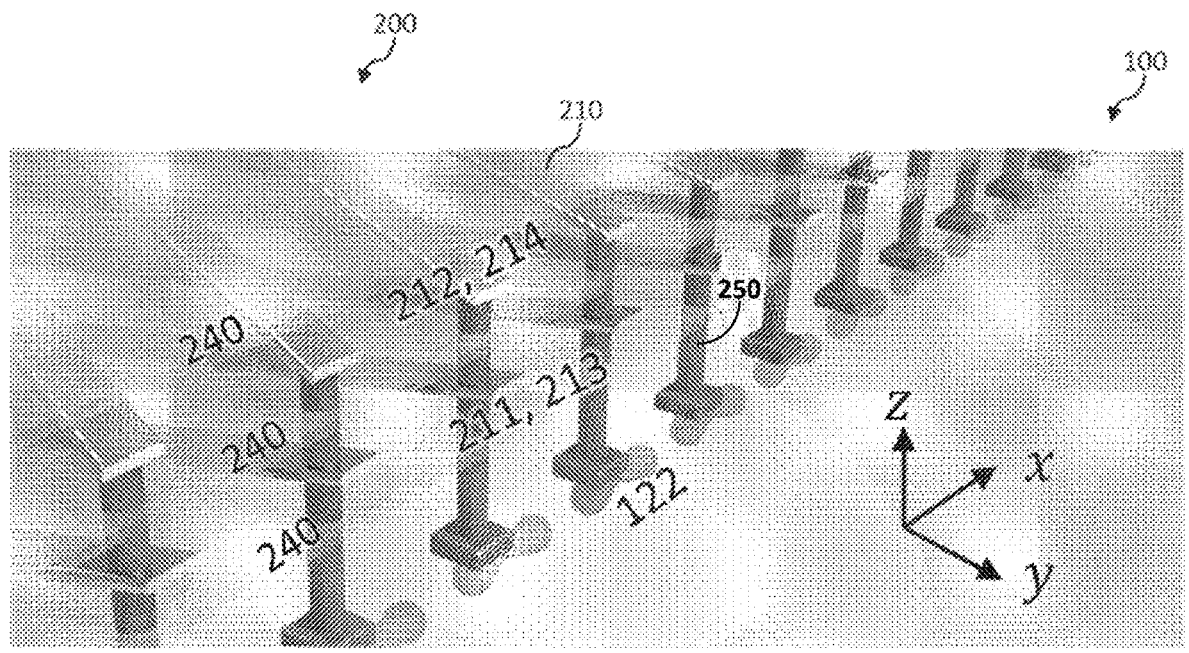
FIG. 4a is a schematic illustration of a qubit device, according to an example.
Figure 4B:
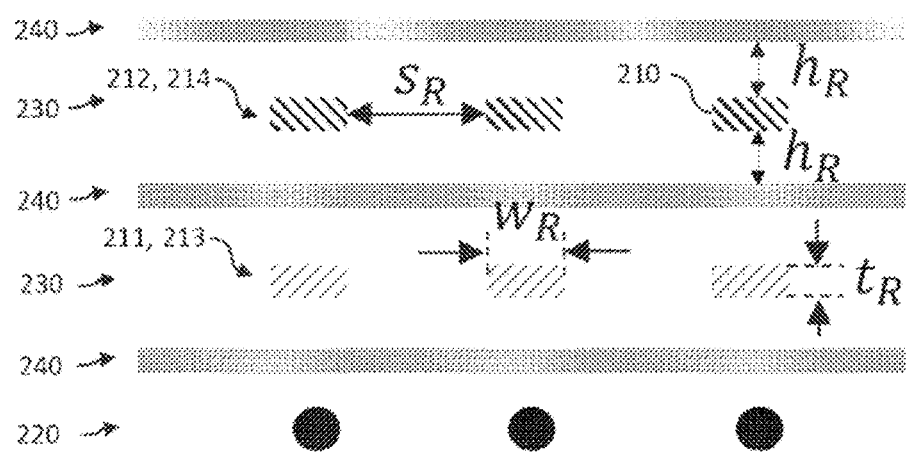
FIG. 4b is a schematic illustration of a qubit device, according to an example.

The superconducting resonators 210 are divided into a first, second, third and fourth sets 211, 212, 213, 214, wherein the first and third sets 211, 213 are in a first resonator plane and the second and fourth sets 212, 214 are in a second resonator plane, to be described further with regards to FIGS. 4a-b.

The first set 211 connects pairs of quantum dots between the first portion of the first array 101 and the first portion of the second array 102, which corresponds to the lines between the first and second row in the left-hand matrix.

The remaining sets 212, 213, 214 of superconducting resonators 210 work in a corresponding manner.

In the example of FIG. 3, a 5×5 matrix is shown, but by using the same principles as shown, any size matrix may be represented by varying the length and number of portions.

FIGS. 4a-b illustrate different planes of the qubit device 200 using an example. FIG. 4a illustrates a single qubit array 100 of two qubit arrays 100 of the qubit device 200. The qubits are arranged in a qubit plane 220 different from two different resonator plane 230 comprising the superconducting resonators 210. The qubits of the other qubit array 100 not shown in FIG. 4a may also be arranged in the same single qubit plane 220.

The superconducting resonators 210 are arranged in two different resonator planes 230 such that every other set 211, 212, 213, 214 of superconducting resonators 210 as discussed in relation to FIG. 3 are arranged in a same resonator plane 230.

The resonators 210 are distanced to the grounding planes 240 by a distance $h_R$ that may be around 30-50 nm, e.g. 40 nm. In such a configuration, most of the electrical field generated by the resonator 210 will be between the conductor of the resonator 210 and the grounding planes 240, with less lateral spread, thereby minimizing cross talk between adjacent resonators 210.

While the resonators 210 are arranged in two resonator planes 230, the resonators 210 of a single resonator plane 230 may in one embodiment still be slightly misaligned with each other, such that they are interleaved with each other at different distances $h_R$ to the grounding planes 240 or the qubit arrays 100 while still remaining in the same single resonator plane 230. This reduces crosstalk of adjacent resonators 210.

The superconducting resonators 210 are arranged parallel to each other. Each resonator 210 in a resonator plane 230 is parallel to each other but not compared to the resonators 210 in the other resonator plane 230.

In FIG. 4a, the resonators 210 are arranged at an angle of around 45° (35°-55°) to the row direction and resonators 210 that are arranged in two different resonator planes 230 are arranged at an angle of around 90° (80°-100°) to each other.

The qubit device 200 of FIGS. 4a-b further comprises three grounding planes 240, one grounding plane 240 between the resonator planes 230, one grounding plane 240 between the qubit plane 220 and the nearest resonator plane 230, and one grounding plane 240 adjacent to the farthest resonator plane 230 at the side opposite the qubit plane 220.

The qubit device 200 of FIGS. 4a-b further comprises a set of vertical connector vias 250, wherein each connector via 250 connects a pair of quantum dots 122a, 122b to at least one superconducting resonator 210.

In the example of FIG. 4b, the same qubit device 200 as in FIG. 4a is shown in a schematic side view. The superconducting resonators 210 are around 0.36 mm long, e.g. 0.25 to 0.50 mm long. Their cross-sections have dimensions of around 50×20 nm, i.e. a width $w_R$ of 40 to 60 nm and a thickness $t_R$ of 10 to 30 nm. They are separated $s_R$ from each other by about 140 nm, e.g. 120 to 160 nm. These dimensions minimize crosstalk between superconducting resonators 210 in the same plane 230.

It is noted that these dimensions correspond to a case using materials like titanium nitride, niobium nitride, and niobium titanium nitride for the superconducting resonators. These materials are associated with a relatively large spin-photon coupling strength. In other terms, these materials have a relatively large London penetration depth (compared to other superconducting materials like Niobium and Tantalum, around ten times larger). Thereby, these materials result in relatively larger kinetic inductance (proportional to the square of the London penetration depth), characteristic impedance of the resonator lines (proportional to the square root of the inductance), and spin-photon coupling strength (proportional to the square root of the impedance). If using superconducting materials with a smaller London penetration depth, the superconducting resonators 210 may be several mm long.

FIGS. 5*a-d* show different qubit gate operations that may be performed by the qubit device. It is noted that either a $\sqrt{iSWAP}$ gate operation or a $\sqrt{SWAP}$ gate operation combined with single qubit gate operations together form a universal gate set that allows any logical operation to be performed.

Figure 5A:
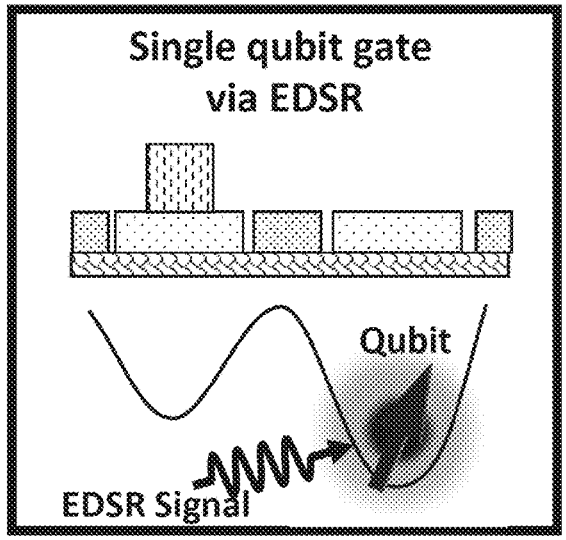
FIG. 5a is a schematic illustration of qubit gate operations, according to an example.

FIG. 5*a* shows a single qubit gate operation facilitated by electric dipole spin resonance (EDSR). The qubit device is configured to apply a single-qubit gate operation to a qubit state within the row of electrostatically confined quantum dots of each qubit array by varying a potential of a first pair of quantum dots comprising a qubit, and to supply a radio-frequency magnetic control field to the qubit to control a spin state of the qubit.

In this example, the spin states of the qubit have been split by an external static magnetic field $B_0$ as discussed in relation to FIG. 1.

The radio-frequency magnetic control field may be an external field that has a frequency equivalent to the energy splitting of the two spin states, thereby inducing a change of the spin state of the qubit.

The radio-frequency magnetic control field may be generated by electrically moving the qubit charge carrier in a magnetic field gradient to enable EDSR-based qubit control. The magnetic field generated by the nanomagnets may induce, at a pair of quantum dots, a spatial magnetic gradient field with a non-zero in-plane component.

Thus, the pairs of quantum dots may be defined within a spatially varying magnetic field, thereby allowing qubit control by means of EDSR. The spatial magnetic gradient field component may be an in-plane component (with respect to the substrate layer) either along the row direction or transverse to the row direction as this may facilitate a faster response of the spin rotation and oscillatory control of the qubit.

That is, the qubit device may be configured to control a spin state of a qubit held at a pair of quantum dots by spatially oscillating the qubit charge carrier within the magnetic gradient field along a direction transverse to the row direction, e.g. using a pair of control gates arranged at opposite sides of the row of quantum dots or arranged at each quantum dot of the pair of quantum dots.

The pair of control gates may generate a varying electrical field such that the qubit due to its oscillation is subjected to a varying out-of-plane magnetic field resonant with the qubit spin resonance frequency, thereby inducing a change of the spin state of the qubit.

The pair of control gates may be a pair of longitudinal confinement gates or a pair of plunger gates or barrier gates as discussed above. The control gates may accordingly generate a varying electrical field such that each qubit in the row of quantum dots oscillate at a frequency such that spin resonance (i.e. spin rotation) is induced only in qubits whose resonance frequency (determined by the relative position of the qubit to the nanomagnets) match the frequency of oscillation.

A radio-frequency magnetic field amplitude $B_{ac}$ at each pair of quantum dots may be between 0.1 mT and 0.4 mT, e.g. 0.2 mT, along an in-plane direction. The magnetic field strength experienced by the qubits may be expressed as $B_{ac} \cos(2\pi f_0 t)$, where $f_0$ is the frequency of oscillation.

$$f_0 = \frac{g_e \mu_B B_0}{h},$$

which may be around 5.6 GHz for a $B_0$ of around 0.2 mT, which allows a spin control at a frequency of $$\frac{g_e \mu_B B_{ac}}{2h},$$

i.e. around 2.8 MHz, based on the principles of magnetic resonance.

Each nanomagnet or pair of nanomagnets may induce a spatial magnetic gradient field with a non-zero in-plane component (e.g. dBy/dy) at the position of the associated pair of quantum dots. The gradient may be between 0.1 mT/nm and 0.4 mT/nm, e.g. 0.2 mT/nm. The spin state of a qubit held at such a pair of quantum dots may hence be controlled through EDSR by spatially oscillating the qubit within the magnetic gradient field along the in-plane direction. An oscillation amplitude of about 1 nm is readily achievable by varying a potential of a pair of control gates arranged at opposite sides of the pair of quantum dots, such as the confinement gates, plunger gates, and/or barrier gates.

As an alternative to a transverse magnetic gradient field component dBy/dy, EDSR may rely on a longitudinal magnetic gradient field component dBx/dy in which case a longitudinal oscillation of the qubit within the magnetic gradient field may be controlled using a pair of barrier gates or plunger gates.

The qubit device may, as an alternative or addition to EDSR-based qubit control, allow qubit control based on electron spin resonance (ESR). For the purpose of supporting ESR-based qubit control, the qubit device may further comprise an ESR transmission line extending along the row(s) of quantum dots. The qubit device may comprise radio-frequency magnetic control field generating circuitry for supplying ESR-control signals to the ESR transmission line to implement ESR-based qubit control in a conventional manner.

A single-qubit gate may generally be implemented as follows. A selected qubit may be transferred to an active pair of quantum dots from an adjacent pair of quantum dots by varying the potential of the relevant pairs of quantum dots. The qubit at the selected pair of quantum dots may then be subjected to a radio-frequency electric (for EDSR-based qubit control) or magnetic (for ESR-based qubit control) control field to control a spin state of the selected qubit.

According to embodiments, the qubit device may further comprise an ESR transmission line extending along the row of quantum dots. The ESR transmission line may be arranged at a level above the nanomagnets, to allow for a smaller separation between the nanomagnets and the quantum dots. The ESR transmission line may be used for spin control of the qubits.

Figure 5C:
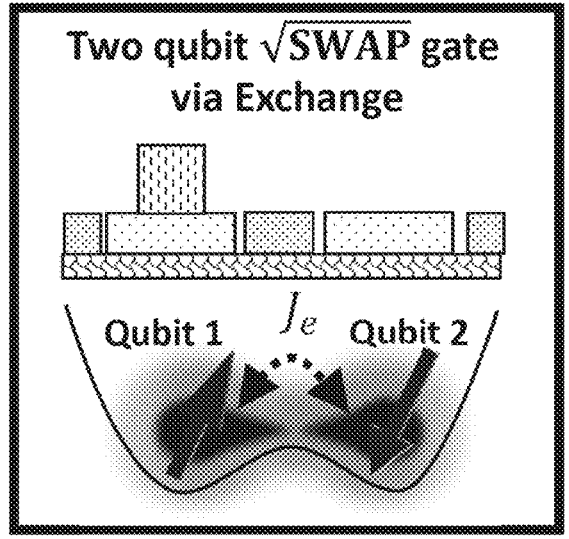
FIG. 5c is a schematic illustration of qubit gate operations, according to an example.
Figure 5B:
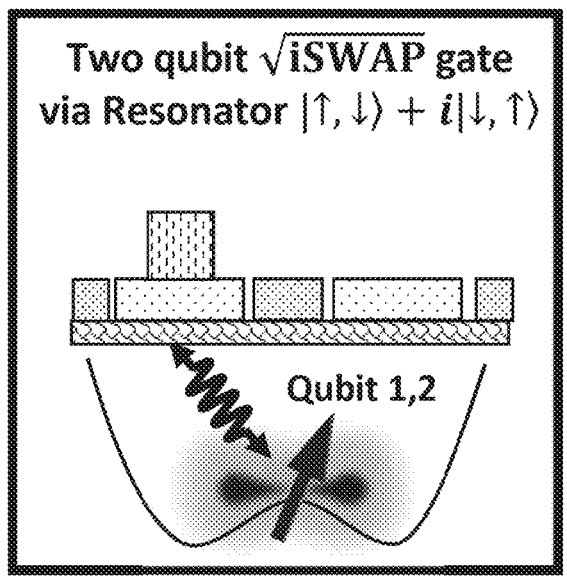
FIG. 5b is a schematic illustration of qubit gate operations, according to an example.

FIG. 5b shows a two-qubit $\sqrt{\text{iSWAP}}$ gate operation. Such a gate operation is applied to two qubit states in the first and second linear qubit arrays by varying a potential of a first pair of quantum dots in the first qubit array comprising a qubit state and varying a potential of a second pair of quantum dots in the second qubit array comprising another qubit state, the first and second pair of quantum dots being associated with the same superconducting resonator. Further, a voltage is applied to the same superconducting resonator.

By varying the potential, e.g. by controlling plunger gates associated with the quantum dots of each relevant pair, the charge carriers defining the qubits may be aligned to the middle of the pairs of quantum dots, which enhances the qubits' interaction with the resonator.

By applying a voltage to the shared superconducting resonator, the two qubits aligned to the middle of their respective pair of quantum dots may interact via the resonator.

FIG. 5c shows another two-qubit gate operation, namely, the $\sqrt{\text{SWAP}}$ gate operation. Such a gate operation is applied to two qubit states in the first or second linear qubit arrays by varying a potential of a first pair of quantum dots comprising a first qubit state and/or a second pair of quantum dots comprising a second qubit state adjacent in the row to the first pair to increase an exchange interaction $J_e$ between the first and second qubit states.

The potential(s) may be varied to e.g. reduce a potential barrier between the two pairs of quantum dots or to raise the bottom of a potential well of one of the two pairs of quantum dots to shuttle the charge carrier defining the qubit state closer to the other one of the two pairs of quantum dots. This may be done by controlling plunger gates and/or barrier gates associated with the quantum dots of each relevant pair.

The qubit device may implement shuttling of qubits along the row of quantum dots by controlling a potential of the quantum dots in a similar manner. A similar approach may also be applied when loading or unloading charge carriers from or to a charge carrier electron reservoir, by lowering or increasing a potential of the quantum dot(s) 122 adjacent to the charge carrier reservoir with respect to the potential of the charge carrier reservoir.

Two-qubit gates (e.g. CNOT/CZ) may be implemented in a corresponding fashion as the $\sqrt{\text{SWAP}}$ gate operation, i.e. by transferring a selected qubit to an active pair of quantum dots that is adjacent to an idle pair of quantum dots also holding a qubit. A two-qubit operation (relying on either ESR or EDSR) may then be performed based on tuning of an exchange coupling between the qubits in the selected and adjacent pairs of quantum dots. The exchange coupling may be tuned by varying a tunnel coupling or energy detuning between the pairs of quantum dots.

Figure 5D:
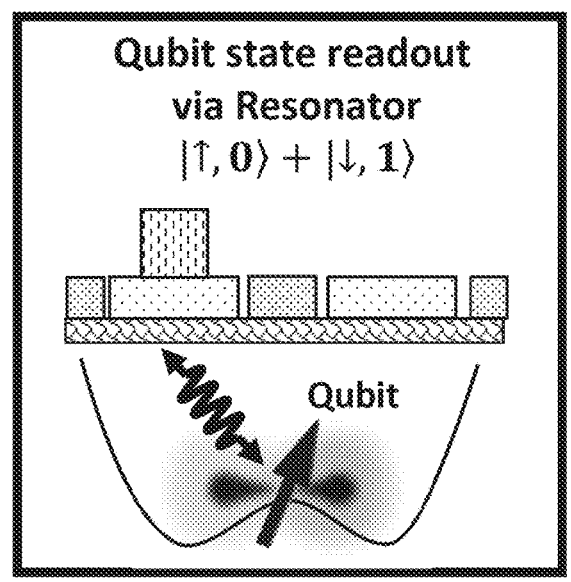
FIG. 5d is a schematic illustration of qubit gate operations, according to an example.

FIG. 5d shows a read operation for reading a qubit state of a pair of quantum dots. This is done by varying a potential of the pair of quantum dots and detecting a resonance frequency of a superconducting resonator associated with the pair of quantum dots.

Varying the potential to align the charge carrier defining the qubit to the middle of the pair of quantum dots is done in a similar manner as in FIG. 5b. To detect a resonance frequency of the superconducting resonator, an electrical signal may be applied to the resonator. The resonance frequency is characteristic to the spin state of the charge carrier defining the qubit. Thereby a state of the qubit may be detected and read.

The qubit device may also be configured to transfer a qubit to be read to a selected quantum dot of a pair of quantum dots associated with a plunger gate connected to a resonator, from an adjacent quantum dot of the pair of quantum dots, by varying a potential of the plunger gate associated with the selected quantum dot and a potential of a plunger gate associated with the adjacent quantum dot, and subsequently detecting a resonance frequency of the resonator connected to the plunger gate associated with the selected quantum dot.

Hence, selective qubit readout may be enabled by transferring or shuttling a qubit (e.g. an electron) to a quantum dot associated with a plunger gate and sensing a resulting resonance frequency of the resonator associated with the quantum dot.

When the qubits at adjacent quantum dots are biased in an appropriate regime, the Pauli-spin exclusion principle results in spin-dependent tunneling of the qubit or electron to its adjacent quantum dot. This spin-dependent inter-dot tunneling may modify the capacitance of the resonator and hence its resonant frequency, facilitating spin readout.

While some embodiments have been illustrated and described in detail in the appended drawings and the foregoing description, such illustration and description are to be considered illustrative and not restrictive. Other variations to the disclosed embodiments can be understood and effected in practicing the claims, from a study of the drawings, the disclosure, and the appended claims. The mere fact that certain measures or features are recited in mutually different dependent claims does not indicate that a combination of these measures or features cannot be used. Any reference signs in the claims should not be construed as limiting the scope.

What is claimed is:

1. A qubit device comprising:
a first linear qubit array and a second linear qubit array, each comprising:
a semiconductor substrate comprising quantum dots organized as a row of pairs of the quantum dots;
control gates configured to define the quantum dots;
nanomagnets arranged at every other pair of the pairs of the quantum dots,
wherein each of the nanomagnets has an out-of-plane magnetization with respect to the semiconductor substrate and wherein every other pair of the pairs of the quantum dots are subjected to an out-of-plane magnetic field generated by a respective nanomagnet of the nanomagnets, such that a qubit spin resonance frequency of every other pair of the pairs of the quantum dots is shifted with respect to an adjacent pair of the pairs of the quantum dots,
wherein the row of the first linear qubit array and of the second linear qubit array extend in a common row direction and are separated along a direction transverse to the common row direction; and
superconducting resonators connecting the pairs of the quantum dots of the first linear qubit array and the pairs of the quantum dots of the second linear qubit array, respectively.

2. The qubit device according to claim 1, wherein the quantum dots of the first linear qubit array and the second linear qubit array are arranged in a single qubit plane different from a resonator plane comprising the superconducting resonators.

3. The qubit device according to claim 1, wherein the first linear qubit array comprises a first portion comprising a first subset of the pairs of the quantum dots and a second portion comprising a second subset of the pairs of the quantum dots and the second linear qubit array comprises a third portion comprising a third subset of the pairs of the quantum dots and a fourth portion comprising a fourth subset of the pairs of the quantum dots;

wherein the superconducting resonators comprise a first set of superconducting resonators that connects a pair of quantum dots in the first portion with a pair of quantum dots in the third portion;

wherein the qubit device further comprises a second set of superconducting resonators connecting a pair of quantum dots in the second portion with a pair of quantum dots in the third portion;

wherein the qubit device further comprises a third set of superconducting resonators connecting a pair of quantum dots in the second portion with a pair of quantum dots in the fourth portion.

4. The qubit device of claim 3, wherein the first portion, the second portion, the third portion, and the fourth portion each comprise the same number of pairs of quantum dots.

5. The qubit device according to claim 3, wherein the first set of superconducting resonators and the third set of superconducting resonators are arranged in a first resonator plane and the second set of superconducting resonators is arranged in a second resonator plane different from the first resonator plane.

6. The qubit device according to claim 5, wherein the first resonator plane is arranged between a first grounding plane and a second grounding plane and the second resonator plane is arranged between the second grounding plane and a third grounding plane, wherein the first grounding plane is arranged between a qubit plane comprising the quantum dots of the first linear qubit array, the second linear qubit array, and the first resonator plane.

7. The qubit device according to claim 1, wherein the superconducting resonators comprise stripline resonators.

8. The qubit device according to claim 1, wherein the first linear qubit array and the second linear qubit array each comprise plunger gates arranged along a longitudinal direction of the row and are each configured to tune an electric potential of each pair of the quantum dots.

9. The qubit device according to claim 1, further comprising connector vias that connect a pair of quantum dots to at least one of the superconducting resonators.

10. The qubit device according to claim 1, wherein the nanomagnets of the first linear qubit array are distributed in two rows such that every other pair of quantum dots of the first linear qubit array is arranged between a pair of nanomagnets as viewed along a direction transverse to the common row direction.

11. The qubit device according to claim 10, wherein the nanomagnets of the second linear qubit array are distributed in two rows such that every other pair of quantum dots of the second linear qubit array is arranged between a pair of nanomagnets as viewed along a direction transverse to the common row direction.

12. The qubit device according to claim 1, wherein the control gates of the first linear qubit array comprise a pair of longitudinal confinement gates arranged at opposite sides of the row as viewed along a direction transverse to the common row direction.

13. The qubit device according to claim 12, wherein the control gates of the second linear qubit array comprise a pair of longitudinal confinement gates arranged at opposite sides of the row as viewed along a direction transverse to the common row direction.

14. The qubit device according to claim 1, wherein the control gates of the first linear qubit array comprise barrier gates and plunger gates arranged alternatingly along the common row direction.

15. The qubit device according to claim 14, wherein the control gates of the second linear qubit array comprise barrier gates and plunger gates arranged alternatingly along the common row direction.

16. The qubit device according to claim 1, further comprising a reservoir gate arranged at the first linear qubit array and at the second linear qubit array.

17. The qubit device according to claim 1, wherein the qubit device is configured to apply a single-qubit gate operation to a qubit state within the row of the first linear qubit array and of the second linear qubit array by varying a potential of a pair of quantum dots comprising a qubit, and to supply a radio-frequency electric or magnetic control field to the qubit to control a spin state of the qubit.

18. The qubit device according to claim 1, wherein the qubit device is further configured to apply a two-qubit gate operation to two qubit states in the first linear qubit array and the second linear qubit array by varying a potential of a first pair of quantum dots in the first linear qubit array comprising a qubit state and varying a potential of a second pair of quantum dots in the second linear qubit array comprising another qubit state, the first pair of quantum dots and the second pair of quantum dots being associated with the same superconducting resonator, and to apply a voltage to the same superconducting resonator.

19. The qubit device according to claim 1, wherein the qubit device is configured to read a qubit state of a pair of quantum dots.

20. The qubit device according to claim 19, wherein the qubit device is configured to read the qubit state by varying a potential of the pair of quantum dots, and detecting a resonance frequency of a superconducting resonator associated with the pair of quantum dots.

* * * * *